US011162837B2

(12) United States Patent
Pal et al.

(10) Patent No.: US 11,162,837 B2
(45) Date of Patent: Nov. 2, 2021

(54) DETECTING FAULTS IN ROTOR DRIVEN EQUIPMENT

(71) Applicant: MachineSense, LLC, Baltimore, MD (US)

(72) Inventors: Biplab Pal, Ellicott City, MD (US); Anshul Bansal, Mathur (IN); Sneha Dutta, Jamshedpur (IN); Pratyay Karar, Howrah (IN); Soumya Boral, Hooghly (IN); Abhisek Dey, Kolkata (IN)

(73) Assignee: MachineSense, LLC, Baltimore, MD (US)

( * ) Notice: Subject to any disclaimer, the term of this patent is extended or adjusted under 35 U.S.C. 154(b) by 39 days.

(21) Appl. No.: 16/439,875

(22) Filed: Jun. 13, 2019

(65) Prior Publication Data

US 2019/0310129 A1  Oct. 10, 2019

Related U.S. Application Data

(60) Division of application No. 14/977,675, filed on Dec. 22, 2015, now abandoned, which is a
(Continued)

(51) Int. Cl.
*G01H 1/00* (2006.01)
*G01M 13/045* (2019.01)

(52) U.S. Cl.
CPC .......... *G01H 1/003* (2013.01); *G01M 13/045* (2013.01)

(58) Field of Classification Search
None
See application file for complete search history.

(56) References Cited

U.S. PATENT DOCUMENTS 4,023,940 A   5/1977  Shultz
4,131,011 A  12/1978  Ling
(Continued)

FOREIGN PATENT DOCUMENTS

CN  201672991    12/2010
CN  102539911 A   7/2012
CN  103399486 A  11/2013
(Continued)

OTHER PUBLICATIONS

Elnady ("On-Shaft Vibration Measurement Using a MEMS Accelerometer for Faults Diagnosis in Rotating Machines", 2013, University of Manchester, School of Mechanical, Aerospace, and Civil Engineering) (Year: 2013).*
(Continued)

*Primary Examiner* — Roy Y Yi
(74) *Attorney, Agent, or Firm* — Fox Rothschild LLP

(57) ABSTRACT

A method and system of detecting faults in rotor driven equipment includes generating data from one or more vibration sensors communicatively coupled to the rotor driven equipment. The data from the one or more machine wearable sensors is collected onto a mobile data collector. The data is sampled at random to estimate a maximum value. Further, a sampling error may be controlled under a predefined value. The data may be analyzed through a combination of Cartesian to Spherical transformation, statistics of the entity extraction (such as variance of azimuthal angle), big data analytics engine and a machine learning engine. A fault is displayed on a user interface associated with the rotor driven equipment.

7 Claims, 10 Drawing Sheets

MRO Analytics Issues

MRO Analytics Issues

MRO Analytics Issues

MRO Analytics Issues

MRO Analytics Issues

MRO Analytics Issues

Related U.S. Application Data continuation-in-part of application No. 14/628,322, filed on Feb. 23, 2015, now abandoned.

(56) References Cited

U.S. PATENT DOCUMENTS

| | | |
|---|---|---|
| 5,150,289 A | 9/1992 | Badavas |
| 5,487,225 A | 1/1996 | Downie |
| 5,610,339 A | 3/1997 | Haseley et al. |
| 5,825,338 A | 10/1998 | Salmon et al. |
| 5,995,561 A | 11/1999 | Yamasaki et al. |
| 6,104,987 A | 8/2000 | Farnsworth |
| 6,289,606 B2 | 9/2001 | Gillette et al. |
| 6,330,525 B1 | 12/2001 | Hays |
| 6,405,108 B1 | 6/2002 | Patel et al. |
| 7,406,399 B2 | 7/2008 | Furem et al. |
| 7,882,394 B2 | 2/2011 | Hosek et al. |
| 7,938,935 B2 | 5/2011 | MacHattie et al. |
| 8,021,462 B2 | 9/2011 | Moretto |
| 8,094,034 B2 | 1/2012 | Patel et al. |
| 8,112,381 B2 | 2/2012 | Yuan et al. |
| 8,126,574 B2 | 2/2012 | Discenzo et al. |
| 8,150,340 B2 | 4/2012 | Albsmeier et al. |
| 8,334,784 B2 | 12/2012 | Patel et al. |
| 8,390,299 B2 | 3/2013 | Laepple et al. |
| 8,405,940 B2 | 3/2013 | Schweitzer, III et al. |
| 8,421,475 B2 | 4/2013 | Thiim |
| 8,433,443 B2 | 4/2013 | Hagerty et al. |
| 8,560,368 B1 | 10/2013 | Maity et al. |
| 8,571,904 B2 | 10/2013 | Guru et al. |
| 8,726,535 B2 | 5/2014 | Garrido et al. |
| 8,868,242 B2 | 10/2014 | Loutfi |
| 8,920,078 B2 | 12/2014 | Woolever |
| 9,052,216 B2 | 6/2015 | Kamel et al. |
| 9,062,536 B2 | 6/2015 | Fischer |
| 9,250,275 B2 | 2/2016 | Patel et al. |
| 9,781,243 B1 | 10/2017 | Huang |
| 10,041,844 B1 | 8/2018 | Brady et al. |
| 2001/0038345 A1 | 11/2001 | Satoh et al. |
| 2002/0143421 A1 | 10/2002 | Wetzer |
| 2004/0102924 A1 | 5/2004 | Jarrell |
| 2004/0176926 A1 | 9/2004 | Edie |
| 2004/0199573 A1 | 10/2004 | Schwarz et al. |
| 2005/0049834 A1 | 3/2005 | Bottomfield |
| 2005/0222794 A1 | 10/2005 | Baird et al. |
| 2006/0137105 A1 | 6/2006 | Hong et al. |
| 2006/0168195 A1 | 7/2006 | Maturana et al. |
| 2006/0208169 A1 | 9/2006 | Breed et al. |
| 2006/0276949 A1 | 12/2006 | Beck et al. |
| 2007/0100518 A1 | 5/2007 | Cooper |
| 2007/0185685 A1 | 8/2007 | Lannes et al. |
| 2007/0193056 A1 | 8/2007 | Switalski |
| 2008/0103732 A1 | 5/2008 | Stoupis |
| 2008/0109185 A1 | 5/2008 | Cheung et al. |
| 2008/0289045 A1 | 11/2008 | Fryer |
| 2008/0294382 A1 | 11/2008 | Lim |
| 2009/0024359 A1 | 1/2009 | Bibelhausen et al. |
| 2009/0043518 A1 | 2/2009 | Roh et al. |
| 2009/0119243 A1 | 5/2009 | Yuan et al. |
| 2010/0023307 A1 | 1/2010 | Lee |
| 2010/0169030 A1 | 7/2010 | Parlos |
| 2010/0199352 A1 | 8/2010 | Hill et al. |
| 2010/0295692 A1 | 11/2010 | Bjorn |
| 2011/0016199 A1 | 1/2011 | De Carlo et al. |
| 2011/0131398 A1 | 6/2011 | Chaturvedi et al. |
| 2011/0137697 A1 | 6/2011 | Yedatore et al. |
| 2011/0216805 A1 | 9/2011 | Fernando et al. |
| 2011/0307220 A1 | 12/2011 | Lacaille |
| 2012/0045068 A1 | 2/2012 | Kim et al. |
| 2012/0166142 A1 | 6/2012 | Maeda et al. |
| 2012/0209569 A1 | 8/2012 | Becourt et al. |
| 2012/0213098 A1 | 8/2012 | Sun |
| 2012/0271576 A1 | 10/2012 | Kamel |
| 2012/0290104 A1 | 11/2012 | Holt et al. |
| 2012/0330499 A1 | 12/2012 | Scheid et al. |
| 2012/0330614 A1 | 12/2012 | Kar |
| 2013/0102284 A1 | 4/2013 | Storozuk |
| 2013/0119047 A1 | 5/2013 | Driussi |
| 2013/0170417 A1 | 7/2013 | Thomas et al. |
| 2013/0173178 A1 | 7/2013 | Poczka et al. |
| 2013/0201316 A1 | 8/2013 | Binder et al. |
| 2013/0268469 A1 | 10/2013 | Sharma et al. |
| 2013/0287060 A1 | 10/2013 | Langdoc et al. |
| 2013/0304677 A1 | 11/2013 | Gupta et al. |
| 2013/0318022 A1 | 11/2013 | Yadav et al. |
| 2014/0129164 A1 | 5/2014 | Gorbold |
| 2014/0132418 A1 | 5/2014 | Lill |
| 2014/0163416 A1 | 6/2014 | Shuck |
| 2014/0186215 A1 | 7/2014 | Shinta et al. |
| 2014/0207394 A1 | 7/2014 | Madden |
| 2014/0223767 A1 | 8/2014 | Arno |
| 2014/0244836 A1 | 8/2014 | Goel et al. |
| 2014/0262130 A1 | 9/2014 | Yenni |
| 2014/0309805 A1 | 10/2014 | Ricci |
| 2014/0314284 A1 | 10/2014 | Movellan et al. |
| 2014/0335480 A1 | 11/2014 | Asenjo et al. |
| 2014/0336791 A1 | 11/2014 | Asenjo et al. |
| 2014/0337429 A1 | 11/2014 | Asenjo et al. |
| 2015/0026044 A1 | 1/2015 | Refaeli |
| 2015/0039250 A1 | 2/2015 | Rank |
| 2015/0094914 A1 | 4/2015 | Abreu |
| 2015/0139817 A1 | 5/2015 | Kowalski |
| 2015/0181313 A1 | 6/2015 | Murphy |
| 2015/0185251 A1 | 7/2015 | Heydron et al. |
| 2015/0233792 A1 | 8/2015 | Gao |
| 2015/0233856 A1 | 8/2015 | Samuilov et al. |
| 2015/0247670 A1 | 9/2015 | Robertson et al. |
| 2015/0261215 A1 | 9/2015 | Blevins |
| 2016/0086285 A1 | 3/2016 | Jordan Peters et al. |
| 2016/0147205 A1 | 5/2016 | Kaufman |
| 2016/0189440 A1 | 6/2016 | Cattone |
| 2016/0209831 A1 | 7/2016 | Pal |
| 2016/0245279 A1 | 8/2016 | Pal et al. |
| 2016/0245686 A1 | 8/2016 | Pal et al. |
| 2016/0245765 A1 | 8/2016 | Pal |
| 2016/0291552 A1 | 10/2016 | Pal et al. |
| 2016/0299183 A1 | 10/2016 | Lee |
| 2016/0313216 A1 | 10/2016 | Pal et al. |
| 2016/0349305 A1 | 12/2016 | Pal |
| 2017/0006135 A1 | 1/2017 | Siebel |
| 2017/0032281 A1 | 2/2017 | Hsu |
| 2017/0060574 A1 | 3/2017 | Malladi et al. |
| 2017/0061608 A1 | 3/2017 | Kim et al. |
| 2017/0163444 A1 | 6/2017 | McLaughlin et al. |
| 2017/0201585 A1 | 7/2017 | Doraiswamy et al. |

FOREIGN PATENT DOCUMENTS

| | | |
|---|---|---|
| CN | 203362223 U | 12/2013 |
| CN | 203588054 U | 5/2014 |
| CN | 104036614 A | 9/2014 |
| EP | 1836576 B1 | 2/2012 |
| EP | 2186613 B1 | 5/2013 |
| EP | 2648393 A1 | 10/2013 |
| WO | WO 2005/086760 A2 | 9/2005 |
| WO | WO 2010/104735 A1 | 9/2010 |
| WO | WO 2013/040855 A1 | 3/2013 |
| WO | WO 2013-041440 A1 | 3/2013 |
| WO | WO 2013/093942 A2 | 6/2013 |
| WO | WO 2014/044906 A1 | 3/2014 |
| WO | WO 2014/085648 A1 | 6/2014 |
| WO | WO 2014/089567 A2 | 6/2014 |
| WO | WO 2014/117245 A1 | 8/2014 |
| WO | WO 2015/022036 A1 | 2/2015 |
| WO | WO 2016/137848 A1 | 9/2016 |
| WO | WO 2017-1234525 A1 | 7/2017 |

OTHER PUBLICATIONS

Papailopoulos ("Distributed Large-Scale Data Storage and Processing", 2014, University of Texas at Austin) (Year: 2015).*

Ebersbach ("Artificial Intelligent System for Integrated Wear Debris and Vibration Analysis in Machine Condition Monitoring," 2007, James Cook University, School of Engineering) (Year: 2007).*

(56) References Cited

OTHER PUBLICATIONS

Vasudevan, Shobha, "Still a Fight to Get it Right: Verification in the Era of Machine Learning", 2017 IEEE International Conference on Rebooting Computing (ICRC), Washington, DC, 2017, pp. 1-8. (Year: 2017).
International Search Report and Written Opinion for PCT Application No. PCT/US16/18820; dated Aug. 4, 2016.
International Search Report and Written Opinion for PCT Application No. PCT/US15/066547; dated Mar. 17, 2016.
Sensors Drive Mobile IoT; Wong, William; Jan. 26, 2015; Electronic Design.
International Search Report and Written Opinion for PCT Application No. PCT/US16/028724; dated Aug. 22, 2016.
International Search Report and Written Opinion for PCT Application No. PCT/US16/18831; dated Aug. 12, 2016.
Fault Detection in Kerman Combined Cycle Power Plant Boilers by Means of Support Vector Machine Classifier Algorithms and PCA by M. Berahman, et al., 3rd International Conference on Control, Instrumentation, and Automation (ICCIA 2013), Dec. 28-30, 2013, Tehran, Iran.
Fault Monitoring and Diagnosis of Induction Machines Based on Harmonic Wavelet Transform and Wavelet neural Network by Qianjin Guo, et al., dated Sep. 2008, published at the Fourth International Conference on Natural Computation.
Fault Diagnosis Method Study in Roller Bearing Based on Wavelet Transform and Stacked Auto-encoder, by Junbo Tan, et al., dated Feb. 2015, published by IEEE.
A Diagnostic Expert System Embedded in a Portable Vibration Analysis Instrument by Dr. Robert Milne, et al., dated May 13, 1991, published at IEE Colloquium on Intelligent Instrumentation.
Detection of Precursor Wear Debris in Lubrication Systems by Jack Edmonds, et al., dated May 2000, published by IEEE.
Fault Diagnosis of Bearing Based on Fuzzy Support Vector Machine, by Haodong Ma, et al., dated Jan. 2015, published by IEEE.
Investigation of the Mechanical Faults Classification using Support Vector Machine Approach by Zhigiang Jiang, et al., dated Aug. 2010, 2010 Second International Conference on Intelligent Human-Machine Systems and Cybernetics.
Impact Characterization of Multiple-Points-Defect on Machine Fault Diagnosis by Muhammad F. Yaqub, et al., 8th IEEE International Conference on Automation Science and Engineering, Aug. 20-24, 2012, Seoul, Korea.
Detection of Generalized-Roughness Bearing Fault by Spectral-Kurtosis Energy of Vibration or Current Signals by Fabio Immovilli, et al., IEEE Transations on Industrial Electronics, vol., 56, No. 11, Nov. 2009.
Intrinsic Mode Function Determination of Faulty Rolling Element Bearing Based on Kurtosis by Wei Kang, et al., Proceeding of the 2015 IEEE International Conference on Information and Automation, Lijiang, China, Aug. 2015.
Condition Monitoring and Fault Diagnosis of Rolling Element Bearings Based on Wavelet Energy Entropy and Som by Shuai Shi, et al., dated Aug. 2012, published by IEEE.
Continuous Hidden Markov Model Based Gear Fault Diagnosis and Incipient Fault Detection by Jian-She Kang, et al., dated Jun. 2011, published by Institute of Electrical and Electronics Engineers (IEEE).
Study on Fault Diagnosis of Gear with Spall using Ferrography and Vibration Analysis by Wei Feng, et al., published in Aug. 2009 at the International Conference on Measuring Technology and Mechatronics Automation.
International Search Report and Written Opinion for PCT Application No. PCT/US2016/067814; dated Apr. 6, 2017.
International Search Report and Written Opinion for PCT Application No. PCT/US2016/067546; dated Apr. 11, 2017.
Krishnamurthy, S. et al. (2008) Automation of Facility Management Processes Using Machine-to-Machine Technologies. In: Floerkemeier C., Langheinrich M., Fleisch E., Mattern F., Sarma S.E. (eds) The Internet of Things. Lecture Notes in Computer Science, vol. 4952. DOI:10.1007/978-3-540-78731-0_5 (Year: 2008).
Holler, J. et al. (2014). "From Machine-to-machine to the Internet of Things: Introduction to a New Age of Intelligence." Chapters 2, 4, 5, 7, 10, 12. Academic Press. DOI:10.1016/13978-0-12-407684-6.00002-4 (Year: 2014).
Azure IoT Edge open for developers to build for the intelligent edge, George, Sam; Azure Internet of Things; Nov. 15, 2017.
Predix Edge Technology Product Brief, General Electric, 2017.
http://ieeexplore.ieee.org/document/8089336/ Future Edge Cloud and Edge Computing for Internet of Things Applications-Janali Pan et al.
Challenges and Solutions of Protecting Variable Speed Drive Motors; Aversa, et al.; Feb. 11, 2013; Presented at the 2013 Texas A&M Conference for Protective Relay Engineers.
Apr. 17, 2018 Non-Final Office Action against Applicant's co-pending U.S. Appl. No. 15/049,098.
Dec. 21, 2018 Non-Final Office Action against Applicant's co-pending U.S. Appl. No. 14/833,111.

\* cited by examiner

| Percentile (P) | Standard Error (e) | Sample Size(n>) |
|---|---|---|
| 95$^{th}$ | 1% | 42,847 |
| 95$^{th}$ | 2% | 10,711 |
| 95$^{th}$ | 3% | 4,760 |
| 98$^{th}$ | 1% | 17,680 |
| 98$^{th}$ | 2% | 4,420 |
| 98$^{th}$ | 3% | 1,964 |

Figure 7

DETECTING FAULTS IN ROTOR DRIVEN EQUIPMENT

CROSS-REFERENCE TO RELATED PATENT APPLICATIONS

This patent application is a 35 USC 121 division of co-pending U.S. patent application Ser. No. 14/977,675, filed 22 Dec. 2015 in the name of Prophecy Sensors, LLC, entitled "Fault Detection in Rotor Driven Equipment using Rotational Invariant Transform of Sub-Sampled 3-Axis Vibrational Data," published 25 Aug. 2016 as United States patent publication US 2016-0245686 A1, the priority of which is claimed under 35 USC 120.

The '675 application is a continuation-in-part of U.S. patent application Ser. No. 14/628,322 filed 23 Feb. 2015 in the name of Prophecy Sensors, LLC, entitled "Real Time Machine Learning Based Predictive and Preventive Maintenance of Vacuum Pump," published 25 Aug. 2016 as United States patent publication US 2016-0245279 A1, the priority of which is claimed under 35 USC 120.

STATEMENT REGARDING FEDERALLY SPONSORED RESEARCH OR DEVELOPMENT

Not applicable.

BACKGROUND OF THE INVENTION

Field of the Invention

The present invention generally relates to fault detection in rotor equipment. More specifically, it relates to fault detection in rotor driven equipment based on a combination of low frequency vibration data, spherical transformation, machine learning and big data architecture.

Description of the Prior Art

Internet of Things (IoT) is a network of uniquely-identifiable, purposed "Things" that are enabled to communicate data pertaining thereto over a wide communication network, whereby the communicated data form a basis for manipulating the operation of the "Things". The "Thing" in the Internet of Things could virtually be anything that fits into a common purpose thereof. For example, the "Thing" could be a person with a heart rate monitor implant, a farm animal with a biochip transponder, an automobile that has built-in sensors to alert its driver when tire pressure is low, or the like, or any other natural or man-made entity that can be assigned a unique IP address and provided with the ability to transfer data over a communication network. Notably, if all the entities in an IoT are machines, then the IoT is referred to as a "Machine to Machine" (M2M) IoT or simply, as M2M IoT.

It is apparent from the aforementioned examples that an entity becomes a "Thing" of an M2M IoT especially, when the entity is attached with one or more sensors capable of capturing one or more types of data pertaining thereto: segregating the data (if applicable); selectively communicating each segregation of data to one or more fellow "Things"; receiving one or more control commands (or instructions) from one or more fellow "Things", wherein the control commands are based on the data received by the fellow "Things"; and executing the control commands results in the manipulation or management of the operation of the corresponding entity. Therefore, in an IoT-enabled system, the "Things" basically manage themselves without any human intervention, thus drastically improving the efficiency thereof.

Some of the prior art non-patent literature, namely "Continuous Hidden Markov Model Based Gear Fault Diagnosis and Incipient Fault Detection" by Jian-She Kang, et al., and "Study on Fault Diagnosis of Gear with Spall using Ferrography and Vibration Analysis" by Wei Feng, et al., have discussed gear condition monitoring based on vibration analysis techniques. The detection and diagnostic capability of some of the most elective techniques were discussed and compared on the basis of experimental results concerning a gear pair affected by a fatigue crack. In particular, the results of approaches based on time-frequency and cyclostationarity analysis were compared against those obtained by means of the well-accepted cepstrum analysis and time-synchronous average analysis.

In prior art non patent literature, namely "Detection of Generalized-Roughness Bearing Fault by Spectral-Kurtosis Energy of Vibration or Current Signals" by Fabio Immovilli, et al.; Intrinsic Mode Function Determination of Faulty Rolling Element Bearing Based on Kurtosis" by Wei Kang, et al.; and "Condition Monitoring and Fault Diagnosis of Rolling Element Bearings Based on Wavelet Energy Entropy and SOM" by Shuai Shi, et al., the sensitivity and robustness of the currently known techniques such as phase and amplitude demodulation, beta kurtosis and wavelet transform were discussed. Fourgear test cases were used: healthy gears, cracked, led and chipped gears. Other non-patent literature, namely "Fault Diagnosis of Bearing Based on Fuzzy Support Vector Machine" by Haodong Ma, et al.; "Investigation of the Mechanical Faults Classification using Support Vector Machine Approach" by Zhiqiang Jiang, et al.; and "Impact Characterization of Multiple-Points-Defect on Machine Fault Diagnosis" by Muhammad F. Yaqub, et al., also discussed SVM (Support Vector machine) classification performance in rolling bearing diagnosis. SVM were introduced into rolling bearings intelligent fault diagnosis due to the fact that it was hard to obtain enough fault samples in practice and due to the perfect performance of SVM.

Vibration and wear debris analyses were the two main condition monitoring techniques for machinery maintenance and fault diagnosis. In practice, these two techniques were usually conducted independently and could only diagnose about 30-40% of faults when used separately. Past non-patent literature, namely "Detection of Precursor Wear Debris in Lubrication Systems" by Jack Edmonds, et al., attempted to combine these two techniques to provide greater and more reliable information.

Rolling element bearings comes under the critical category in many rotating machineries, mainly in chemical industry, aviation industry, nuclear power stations etc. Vibration monitoring and analysis may be useful tool in the field of predictive maintenance. Health of rolling element bearings was previously attempted to be identified using vibration monitoring as vibration signature reveals important information about the fault development within them.

Previous non-patent literature, namely "A Diagnostic Expert System Embedded in a Portable Vibration Analysis Instrument" by Dr. Robert Milne, et al., also discussed development of an expert system for vibration analysis of a fixed plant, as well as laboratory and industry testing. The expert system incorporated triaxial and demodulated frequency and time domain vibration data analysis algorithms for high accuracy fault detection.

Also, some non-patent literature, namely "Fault Diagnosis Method Study in Roller Bearing Based on Wavelet Transform and Stacked Auto-encoder" by Junbo Tan, et al., suggested the use of wavelet packet analysis for fault diagnosis of roller bearings. Further, prior art literature, namely "Fault Monitoring and Diagnosis of Induction Machines Based on Harmonic Wavelet Transform and Wavelet neural Network" by Qianjin Guo, et al., also suggested the use of neural networks and wavelet transforms to diagnose faults in rotating machinery.

Some non-patent literature, namely "Fault Detection in Kerman Combined Cycle Power Plant Boilers by Means of Support Vector Machine Classifier Algorithms and PCA" by M. Berahman, et al., used information contained in vibration signals to devise a system for alarm detection and diagnosis of failures in mechanical components of power wind mills. A method that uses the one-class-v-SVM paradigm was employed.

Further, wavelets were applied to gearbox vibration signals for fault detection.

However, none of the prior arts show or suggest the use of low frequency vibration data or use of big data architectures to diagnose faults in rotor driven equipment.

It is evident from the discussion of the aforementioned prior arts that none of them pave way for fault detection in rotor driven equipment through big data analytics. Therefore, there exists a need in the art for a solution to the aforementioned problem.

SUMMARY OF THE INVENTION

Disclosed are a method, an apparatus and/or a system of fault detection in rotor driven equipment through big data analytics.

In one aspect, the present invention relates to a method of detecting faults in rotor driven equipment, the method includes generating data from one or more machine wearable sensors communicatively coupled to the rotor driven equipment. The data from the one or more machine wearable sensors is collected onto a mobile data collector. The data is sampled at random to estimate a maximum value. Further, a sampling error may be controlled under a predefined value. The data may be analyzed through a combination of big data analytics engine and a machine learning engine. A fault is displayed on a user interface associated with the rotor driven equipment.

In another aspect, the present invention relates to a method of predicting rotor driven equipment issues, the method comprises: collecting, through a processor, data associated with one or more machine wearable sensors associated with a rotor driven equipment; and transmitting the data collected at the one or more machine wearable sensors over a communication network to a mobile data collector. The data is collected over a finite time period and transmitted to a machine learning engine. The machine learning engine is associated with a computer database hosting real time and historical data. The method further includes visualizing, through a processor, one or more rotor driven equipment issue based on an analysis through a combination of a big data engine and a machine learning engine. Further, the method includes indicating the one or more rotor driven equipment issues through a user interface dynamic and setting an alarm, through a processor, for the one or more rotor driven equipment issue.

The methods and systems disclosed herein may be implemented in any means for achieving various aspects of intended results and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of the present invention are illustrated by way of example and not as limitation in the figures in which similar elements are indicated with same references.

FIG. 7 shows a table wherein the sample size depends on Standard Error and different percentiles, according to one embodiment.

Figure 1:
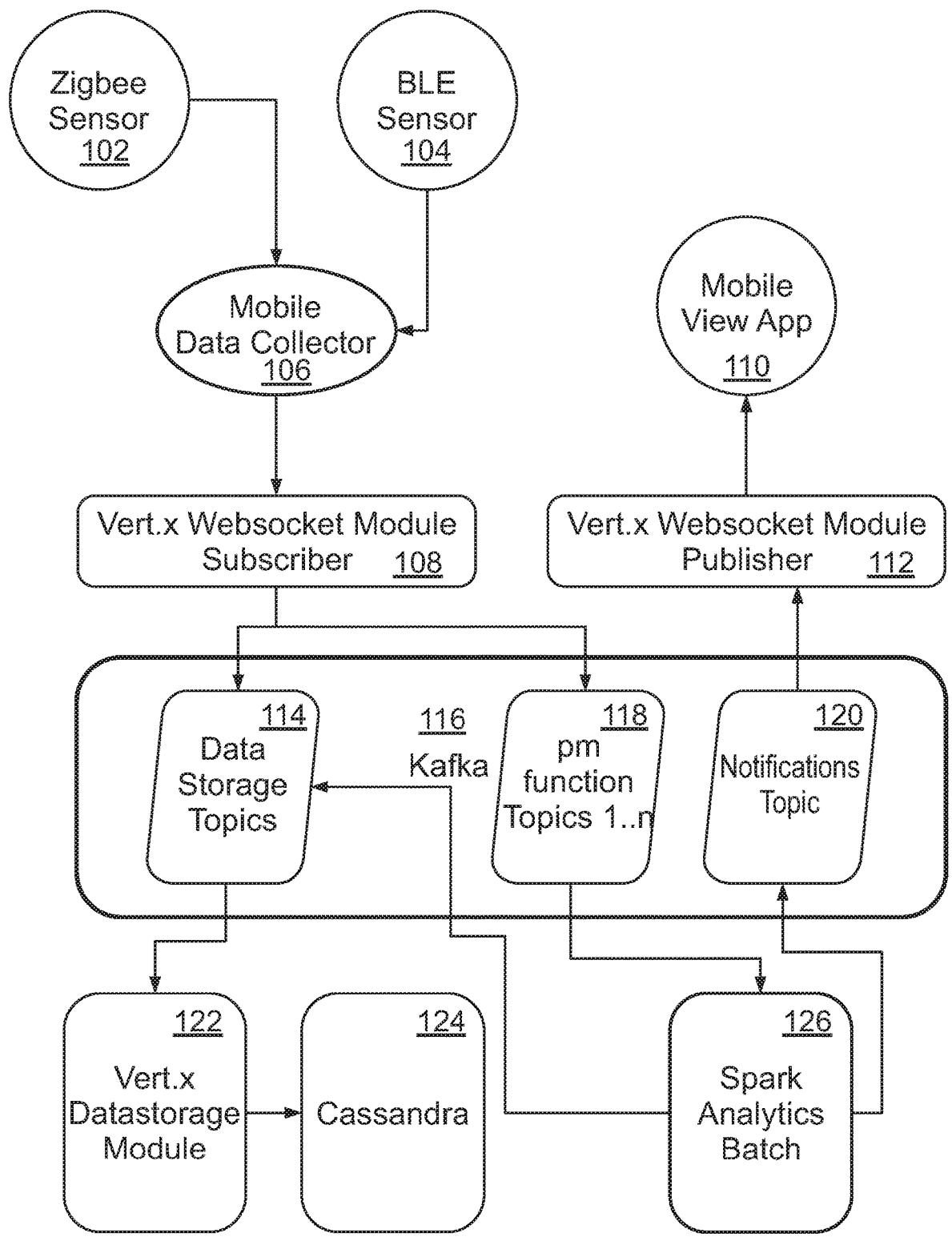
FIG. 1 is a diagrammatic representation of an overall architecture fault detection in rotor driven equipment using low frequency vibration data and big data architecture, according to one embodiment.

The following detailed description is merely exemplary in nature and is not intended to limit the described embodiments of the invention or uses of the described embodiments. As used herein, the words "exemplary" and "illustrative" mean "serving as an example, instance, or for illustration." Any implementation or embodiment or abstract disclosed herein as being "exemplary" or "illustrative" is not necessarily to be construed as preferred or advantageous over other implementations, aspects, or embodiments. All of the implementations or embodiments described in the detailed description are exemplary implementations and embodiments provided to enable persons of skill in the art to make and to use the implementations and embodiments as disclosed below, to otherwise practice the invention, and are not intended to limit the scope of the invention, which is defined by the claims.

Furthermore, by this disclosure, there is no intention on the part of the Applicant to be bound by any express or implied theory presented in the preceding materials, including but not limited to the summary of the invention or the description of the prior art, or in the following detailed description of the invention. It is to be understood that the specific implementations, devices, processes, aspects, and the like illustrated in the attached drawings and described in the following portion of the application, usually referred to as the "specification," are simply exemplary embodiments of the inventive concepts defined in the claims. Accordingly, specific dimensions and other physical characteristics relating to the embodiments disclosed herein are not to be considered as limiting as respecting the invention unless the claims or the specification expressly state otherwise.

DETAILED DESCRIPTION OF THE INVENTION

Example embodiments as described below may be used to provide a method, an apparatus and/or a system for fault detection in rotor driven equipment through big data analytics. Although the present embodiments have been described with reference to specific example embodiments, it will be evident that various modifications and changes may be made to these embodiments without departing from the broader spirit and scope of the various embodiments.

In one or more embodiments, vibrations of a fault free rotor in time domain may be represented by $$x\_j(t) = \Sigma_{i=1}^{\infty} a_i * \sin(i * \Omega * t) | j=1,2,2$$

$\Omega$ is fundamental frequency and i, j, and k are three Cartesian vectors. In vibration analysis of a rotor, revolution per second of rotor may be multiplied by $2\pi$.

Fundamental harmonics and other harmonics generated by a rotor may depend on the rotor's speed. Rotation speed of the rotor may commonly vary between 200-3000 RPM (Revolutions Per Minute). With such rotation speeds, the fundamental harmonics and other harmonics generated may be in high frequency range. Traditional methods of fault detection in rotor machinery are based on physics of harmonics in high frequency ranges.

Due to high frequency range solutions, traditional methods use expensive vibration sensors. The expensive vibration sensors may sample vibration data at very high sampling rate. Local electronics to perform computations like real time fast Fourier transform may be used. The real time fast Fourier transform may detect the difference between harmonics in normal and faulty states.

Further, due to high frequency sampling, data may need to be transmitted at high data rate. The high data rate transmission may not be possible over lower bandwidth wireless sensor network such as Zigbee and/or Piconet. High data rate is not suitable for real time analysis on a server or locally. Real time analysis may require a higher computational RAM (Random Access Memory) and processing power.

In one or more embodiments, random sampling may include a subset of a statistical population. Each member of the subset may have an equal probability of being chosen. A simple random sample may be an unbiased representation of a group.

In one or more embodiments, techniques described herein do not involve envelope detection but random sampling of a vibration signal envelope. The random sampling may be to estimate maximum value through a percentile and/or Root Meansquare value through variance of a signal. The random sampling may involve large number of samples to reduce sampling errors due to finite size of a batch of data collected. In statistics, sampling error may be caused by observing a sample instead of a whole population. The sampling error may be the difference between a sample statistic used to estimate a population parameter and an actual but unknown value of the population parameter.

Techniques described herein may include variance, kurtosis, percentile and crest factor (maximum value/RMS value of a periodic signal). Estimate of a size of batch may be important to control sampling error under a predetermined value such as 1%.

In one or more embodiments, a distribution's degree of kurtosis may be defined as $$\eta = \beta_2 - 3,$$

wherein $$\beta_2 = \frac{\Sigma(Y-\mu)^4}{n\sigma^4},$$

the expected value of the distribution of Z scores which have been raised to the 4th power.

$\beta 2$ may be often referred to as "Pearson's kurtosis," and $\beta 2-3$ (often symbolized with $\gamma 2$) may be referred to as Kurtosis excess and/or Fisher's kurtosis. An unbiased estimator for $\gamma 2$ may be $$g_2 = \frac{n(n-1)\Sigma Z^4}{(n-1)(n-2)(n-3)} - \frac{3(n-1)^2}{(n-2)(n-3)}$$

For large sample sizes (n>1000), g2 may be distributed approximately normally, with a standard error (S.E) of approximately: $\sqrt{24/n}$ So, S.E(g2)=$\sqrt{(24/n)}$.

Figure 6:
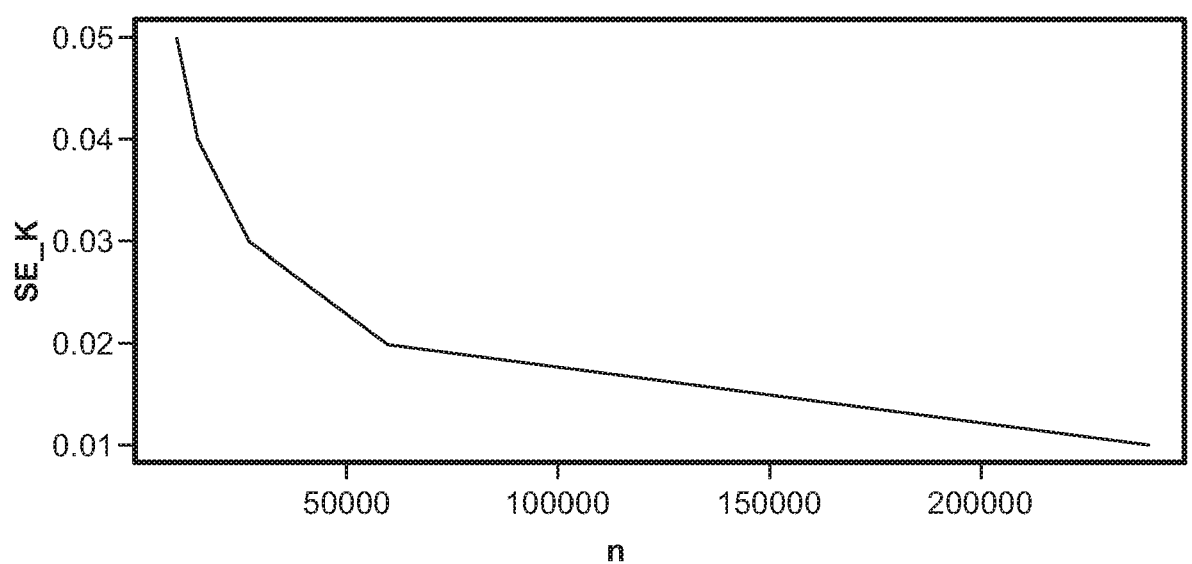
FIG. 6 is a graph showing standard error of estimate of kurtosis against a sample size, according to one or more embodiments.

FIG. 6 is a graph showing standard error (S. E) of estimate of kurtosis against a sample size, according to one or more embodiments. For example, if the S. E reduces to 5% or lesser, then the sample size must be 9600 or greater.

In one or more embodiments, a root mean square (RMS), may also be known as the quadratic mean. In statistics, RMS may be a statistical measure defined as the square root of a mean of squares of a sample.

$$RMS = \sqrt{\Sigma_1^n x_i^2}$$

where $x_1, x_2 \ldots x_n$ may be Gaussian distribution with mean zero and variance 1. Then standard error of RMS may be a function of n, where n may be a sample size.

Standard Error may be:

$$S.E.(RMS) = \sqrt{1 - \frac{2*\left(\text{Gamma}\left(\frac{n+1}{2}\right)\right)^2}{n*\left(\text{Gamma}\left(\frac{n}{2}\right)\right)^2}}$$

where Gamma(x)=(x-1)*Gamma(x-1)=(x-1)!

In an example embodiment, solving the above equation for S.E, it may be claimed that 1% sampling error (S.E (RMS)) may be obtained at a sample size of 4800. i.e., S.E(RMS)=0.01023, when n=4793. Therefore, if n=4800 (approximately), S.E(RMS)=0.01.

In one or more embodiments, a percentile may be a measure used in statistics indicating a value, below which a given percentage of observations in a group of observations fall. For example, the 95th percentile is a value (or score), below which 95 percent of observations may be found. Statistically if xp is the P-th percentile and if X is a random variable following any distribution the $$\text{Probability}(X < x_p) = P$$

If $x_1, x_2, \ldots x_n$ are Gaussian distribution with mean zero and variance one (1) then Standard error of $x_p$ is $$S.E(x_p) = \frac{1}{f(x_p)} \sqrt{\frac{P(1-P)}{n}}$$

where $f(\bullet)$ is a density function of $N(0,1)$. Now $S.E(x_p) < 0.01$ implies $$n > \frac{2\pi P(1-P)}{(e)^2 \exp^2\left(-\frac{x_p^2}{2}\right)}$$

e is standard error, in this case it is 0.01.

To estimate $x_p$ simulation method may been applied. The simulation method may give an estimation of $x_p$ is as 1.63224 as the distribution is $N(0,1)$.

FIG. 7 shows a table, wherein the sample size depends on Standard Error and different percentiles, according to one embodiment. For example, to estimate 98th percentile with less than 2% standard error the sample size may be greater than 4,420.

In one or more embodiments, a system of machine wearable sensors mounted on machines for collecting temperature, vibration, current, voltage, phase lag, vacuum, magnetic field and gyroscopic data may be used to record data. The data collected may be in structured and/or un-structured format. For example, audio data may be in an un-structured format. Data may be collected with primary meta-data classification such as "baseline" and "test" where baseline refers to normal operating condition and/or a condition referring to a good machine and test data may be classified according to the need of the testing.

Sensor data may be fed via a data hub (example: a mobile application) to a cloud server. The cloud server may collect, analyze and store the sensor data using Big Data technology such as Kafka, NoSql, Cassandra and Apache Spark.

Machine learning may be a part of artificial intelligence. Intelligence in machines may be developed by developing algorithms that may learn from data over time and improve the predictions accordingly. Two most widely used machine learning methods are supervised and un-supervised learning methods. To analyze and predict the machine faults both the supervised and un-supervised learning methods may be used.

Figure 5:
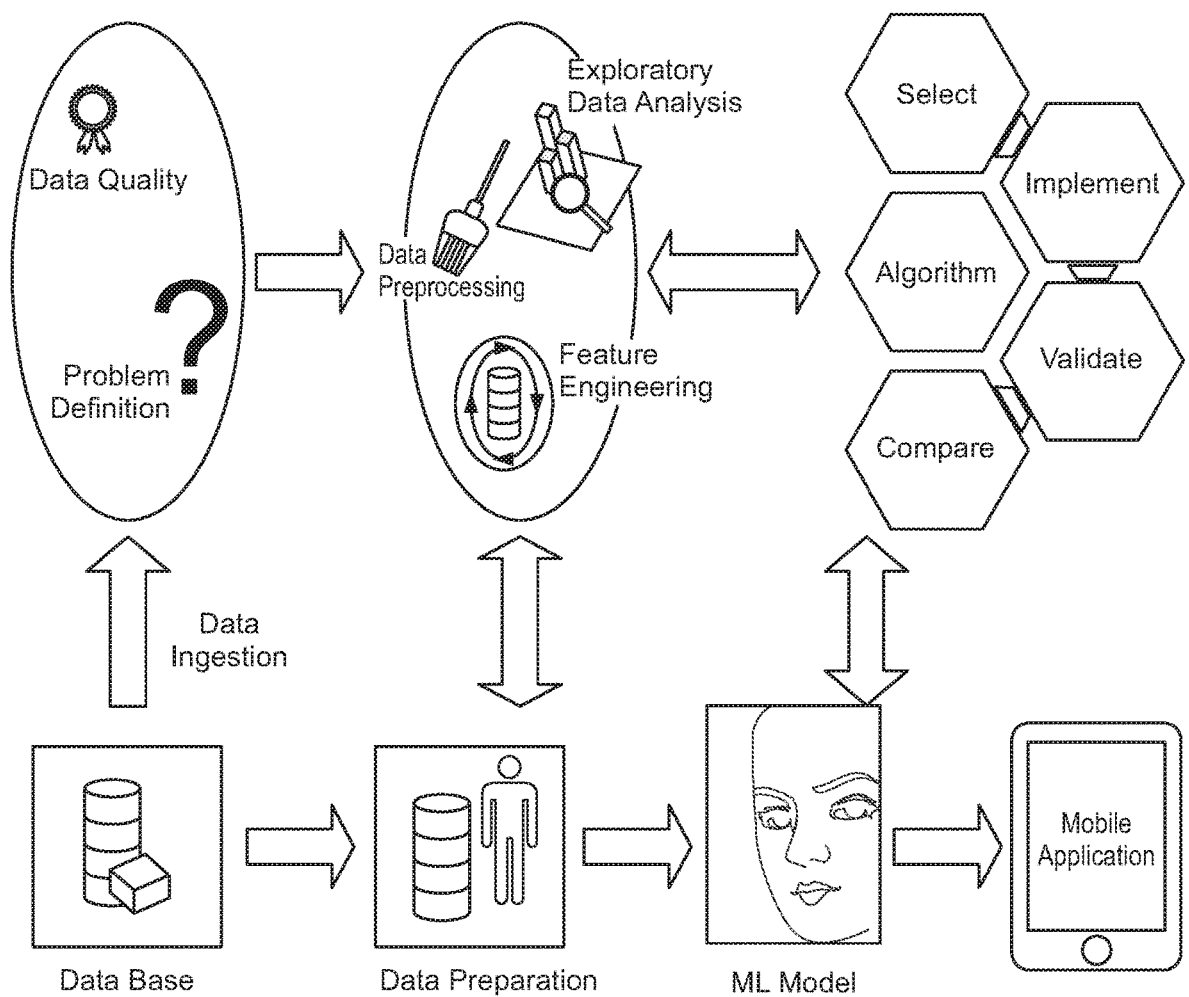
FIG. 5 shows a data flow pipeline associated with machine learning, according to one embodiment.

FIG. 5 shows a data flow pipeline associated with machine learning, according to one embodiment. The data flow pipeline may be designed to accommodate data volume and automation.

In an example embodiment, a user may need to identify whether a rotor machinery is operated in an abusive manner or not. In terms of machine learning, it can be formulated as binary and/or multiclass supervised classification problem where the objective is to classify whether the pressure at which the machine is being operated is normal or abusive.

The data collected from different sensors may be directional and/or non-directional data. For example, temperature related data may be in a scalar form but magnetic field and/or vibration data may be in a vector form Similar sensor packages may be installed across different factories over different machines. To develop a generalized solution which may work across sensors installed at different locations in different conditions, data normalization and/or data transformation may be performed.

The data collected by sensors may be in Cartesian coordinate system. So the raw vector data from the sensor is not rotationally invariant. Rotational invariance of data is compulsory for an MEMS based accelerometer sensor since its internal frame of axis rotates all the time. In order to make it rotationally invariant spherical transformation may be performed using the following equations:

$$r = \sqrt{x^2 + y^2 + z^2}$$
$$\theta = \cos^{-1}\frac{z}{r}$$
$$\Phi = \tan^{-1}\frac{y}{x}$$

In one or more embodiments ensuring data quality may be a pre-step to any data analysis. In data quality completeness, validity, consistency, timeliness and accuracy of data may be tested. After data check, exploratory data analysis may be used performed in order to perform data cleaning and feature engineering. Through exploratory data analysis for applications like abusive operation detection, oil level detection, high belt tension detection, oil state identification, etc., the following features have been shortlisted to build machine learning based model. Table 1 shows the features and definitions along with respective explanations.

TABLE 1

| Feature | Definition | Explanation |
| --- | --- | --- |
| Variance of Theta | variance of energy ratio of principal axis to oblique plane | Indicative of unstable rotation axis which happens when rotor is becoming unstable |
| Kurtosis of Theta | Statistical distribution of energy distribution across the axis | Indicative of loss of balance in rotor |
| Crest factor | Peak to RMS, indicative of % of harmonics in the signal | Indicative of bearing friction |
| RMS of R | The root mean square value of the amplitude of vibration | Total energy as moving average |
| Kurtosis of R | Nature statistical distribution of vibration | Indicative of bearing failure |
| Percentile ratio of RMS | 98:2, 95:5, 90:10, 80:20 etc. | Measure the normalized difference in vibration introduced by faults |
| Ratio of RMS | Ratio of RMS of X, Y; Y, Z and Z, X | Indicative of belt tension |
| Mean temperature | Mean value of the temperature | Indicative of the friction/random motions |

Figure 8:
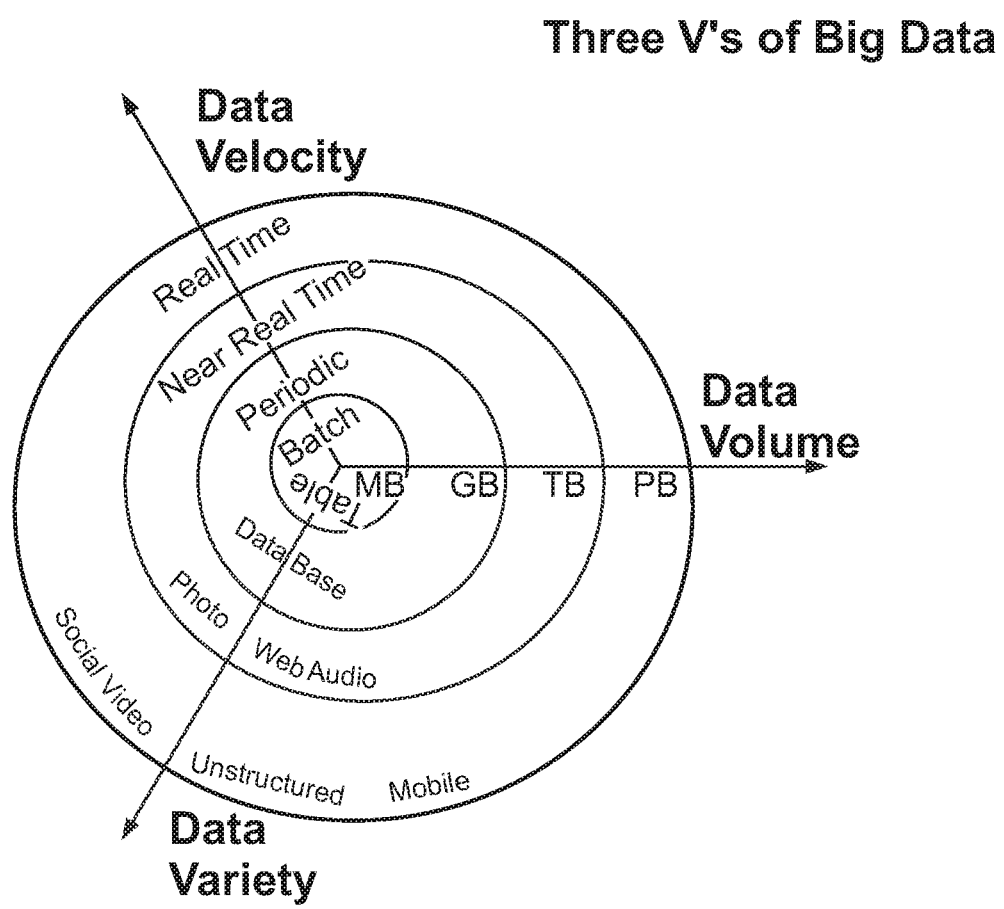
FIG. 8 depicts V's of big data: volume, velocity and variety, according to one or more embodiments.

FIG. 8 depicts V's of big data: volume, velocity and variety, according to one or more embodiments. The data collected may come from several factories. The data may be high volume data and a solution may need to be delivered in near real time so the data is also a high velocity data. As discussed, the data can be structured, un-structured and audio data, so data may comprise a wide variety.

Abusive Operation Identification

In one or more embodiments, a motor may need to be operated in a particular speed range. When the speed range increases, the pressure at which the motor is operating also increases, leading to faults in the motor.

When there is a fault in a plant, the motor may produce more turbulent vibrations. The more turbulent vibrations may add more harmonics. Due to increased harmonics, there may be a change in many statistical properties of a vibrating motor. When a pump is operated in an abusive manner, the pump generates random vibrations and thus more harmonics. In order to capture the difference in normal operation and abusive operation, the set of features discussed in Table 1 may be considered to develop a machine learning based solution for identification of the abusive operation.

TABLE 2

| Algorithm | F1 Score | Precision | Recall | Accuracy |
|---|---|---|---|---|
| SVM | .55 | .68 | .49 | .64 |
| Naïve Bayes | .50 | .65 | .33 | .57 |
| Random Forest | .59 | .61 | .58 | .62 |

In an example embodiment, the results in Table 2 may be generated by collecting data from a 5 hp pump. To generate each record for a training file, the pump may be operated for 30 minutes and then the features mentioned in Table 1 may be calculated from the batch of 30 minutes of data.

In one or more embodiments, SVM algorithm may provide highest precision and random forest algorithm may provide a highest recall. In case of abusive operation, both precision and recall may be important.

Figure 4:
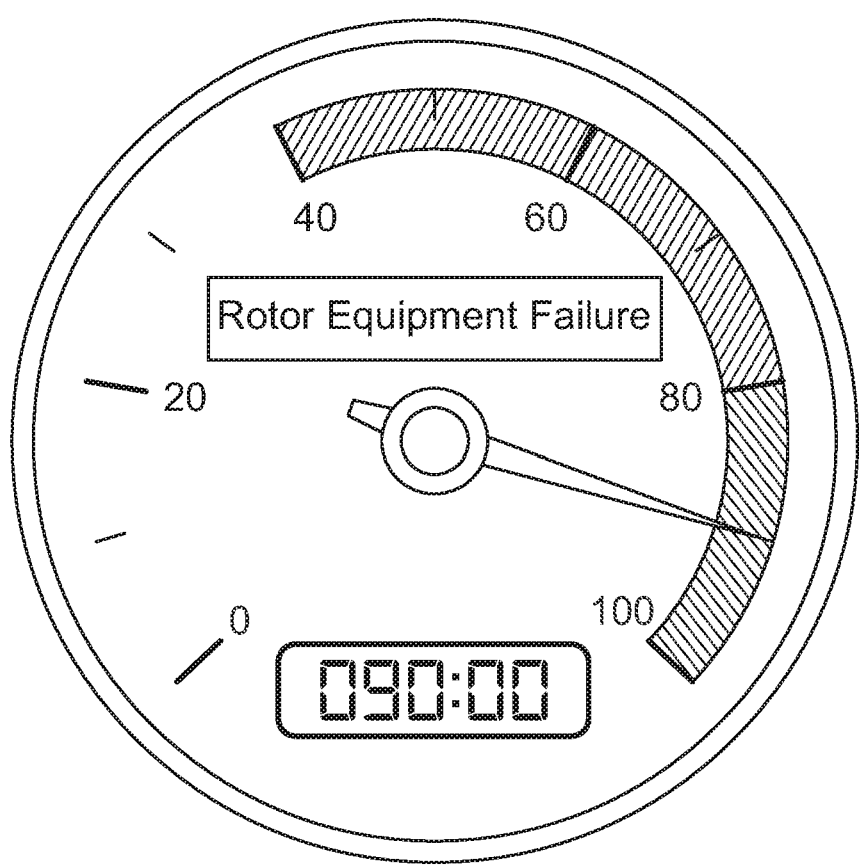
FIG. 4 is a diagrammatic representation of a circular gauge to depict a state of a rotor driven equipment, according to one example embodiment.

FIG. 4 shows a circular gauge depicting circular equipment failure according to one embodiment. One of the issues of analytics may be effective visualization of the processed results and/or alarm system. In one approach, results may be mapped into a simple "Circular Gauge" with a normalized scale of 0-100, where a user may set scales for setting up an alarm and scaling up predictive maintenance issue on rotor driven equipment. Thus, complex results of Big Data IoT analytics associated with rotor driven equipment may be visualized by applying the techniques disclosed herein.

The results may be visualized through a web and/or mobile application. The web and/or mobile application may be associated with devices such as personal computers, laptops, mobile device, tablets etc.

In one or more embodiments, a retrofit sensor mounting may be used to monitor rotor driven equipment. The monitoring may be, for example, in a factory with multiple machines. Sensor data may be fed to a cloud server via a data hub (such as a mobile app). The data hub may collect, analyze and store the sensor data using Big Data technology (such as Kafka, NoSQL, Cassandra and map reduced systems like Apache Spark).

In one or more embodiments, big data may be a term used to refer to large data sets. The data sets may be so large and complex that traditional data processing systems may be inadequate to handle the data sets. The data collected at IoT sensors associated with rotor driven equipment may be extremely large and complex. The data may be collected onto a big data server over a cloud. The big data server may refer to one or more servers associated with the IoT sensors.

In one or more embodiments, data may be collected with primary meta-data classification such as "Baseline" and "Test", where baseline refers to normal operating condition and/or a condition referred to a healthy machine. Test data may be classified according to the need of testing. Historical statistics like energy consumption of different loads, machines, shifts, etc., may be tracked using an energy efficient mechanism.

In an example embodiment, sensor data may be determined from a sensor such as a machine wearable sensor. The sensor may be associated with rotor driven equipment.

In one or more embodiments, a communication network may be one of a WiFi, 2G, 3G, 4G, GPRS, EDGE, Bluetooth, ZigBee, Piconet of BLE, Zwave or a combination thereof.

In one or more embodiments, the machine learning engine may be associated with a machine learning algorithm.

In an example embodiment, a depiction on a user interface may be a circular gauge type representation as shown in FIG. 4.

Further, the circular gauge may be associated with color schemes such as red, yellow and green. In an exemplary embodiment, the color scheme red may indicate an alarming rotor driven equipment condition, yellow may indicate an impending rotor driven equipment issue and green may indicate healthy rotor driven equipment.

In one or more embodiments, an alarm may be raised when the color scheme is one of a yellow and a red.

In one or more embodiments, a method of predicting a rotor driven equipment issue may include: collecting one or more rotor driven equipment readings from one or more IoT sensors through a processor; transmitting over a communication network and also sending the one or more collected rotor driven equipment readings to a machine learning engine. Further, the method may include visualizing one or more rotor driven equipment issues through a processor based on an analysis through a big data engine and indicating the one or more electrical line issues through a user interface dynamic. The user interface dynamic may be a predictive maintenance circular gauge. An alarm may be set, through a processor, for the one or more rotor driven equipment issues.

In one or more embodiments, the machine learning engine may be associated with a machine learning algorithm. The machine learning engine may be capable of receiving rotor driven equipment data from one or more sensors. The machine learning engine may process the received data to recognize one of a pattern and a deviation to issue alarm and control commands pertaining to the rotor driven equipment in association with the communications network.

Further, the machine learning engine may be associated with a multi-classification engine such as an oblique and/or support vector machine. The support vector machines may be supervised learning models with associated learning algorithms that analyze data and recognize patterns. The supervised learning models may be used for classification and regression analysis.

In one or more embodiments, steps of the multi-classification engine may include data transformation to achieve maximum separation among fault types. The data transformation may lead to more accurate multi classification e.g. linear discriminant functions. Further, nonlinear hyper plane fitting may be done to classify different fault types, e.g. quadratic hyper planes in transformed variable space, developing a measure to represent the degree of fault based on machine learning multi-fault classification approach. The intensity of fault may be calculated, e.g. posterior probability of fault type. The degree of fault information may be mapped onto the circular gauge such as in FIG. 4. For example, different fault type posterior probabilities may be combined to get circular gauge representation. User calibration of the circular gauge may be enabled to include user intuition about the machine state into the analytics process. The multi classification may end when the user agrees with the circular gauge.

In one or more embodiments, the distributed power line diagnosis system may utilize multi-layer big gauge based Big Data visualization to simplify issues and alarms associated with rotor driven equipment.

The rotor driven equipment diagnosis system may include two layers, first front layer being a gauge (single or multi-parametric or multi-dimensional) and second layer being analytical. A user may set an alarm for rotor driven equipment issues such as oil state, oil level, high belt tension, etc., based on direct rules and/or multi-classification machine learning algorithm using a Base-Line(BL) calibration method.

FIG. 1 is a diagrammatic representation of an overall architecture fault detection in rotor driven equipment using low frequency vibration data and big data architecture, according to one embodiment. The overall architecture 100 may include a Zigbee sensor 102, and a BLE sensor 104 to collect rotor driven equipment data. The rotor driven equipment data may be collected onto a mobile data collector 106 associated with a web-socket module subscriber 108. The web-socket module subscriber 108 may be associated with data storage topics module 114 and in turn associated with a data storage module 122. The data storage module 122 may be associated with Cassandra 124. The web-socket module subscriber 108 maybe associated with PM (predictive maintenance) topics 1-$n$ 118. The PM topics 1-$n$ 118 may be associated with a Spark analytics batch 126. The spark analytics batch 126 may be associated with notifications topic 120. The notifications topic 120 may be associated with web-socket module publisher 112. The web-socket module publisher 112 may be associated with a mobile view application 110. A kafka module 116 may act as a point of connecting data collection, analytics and result publishing functionalities.

Figure 2:
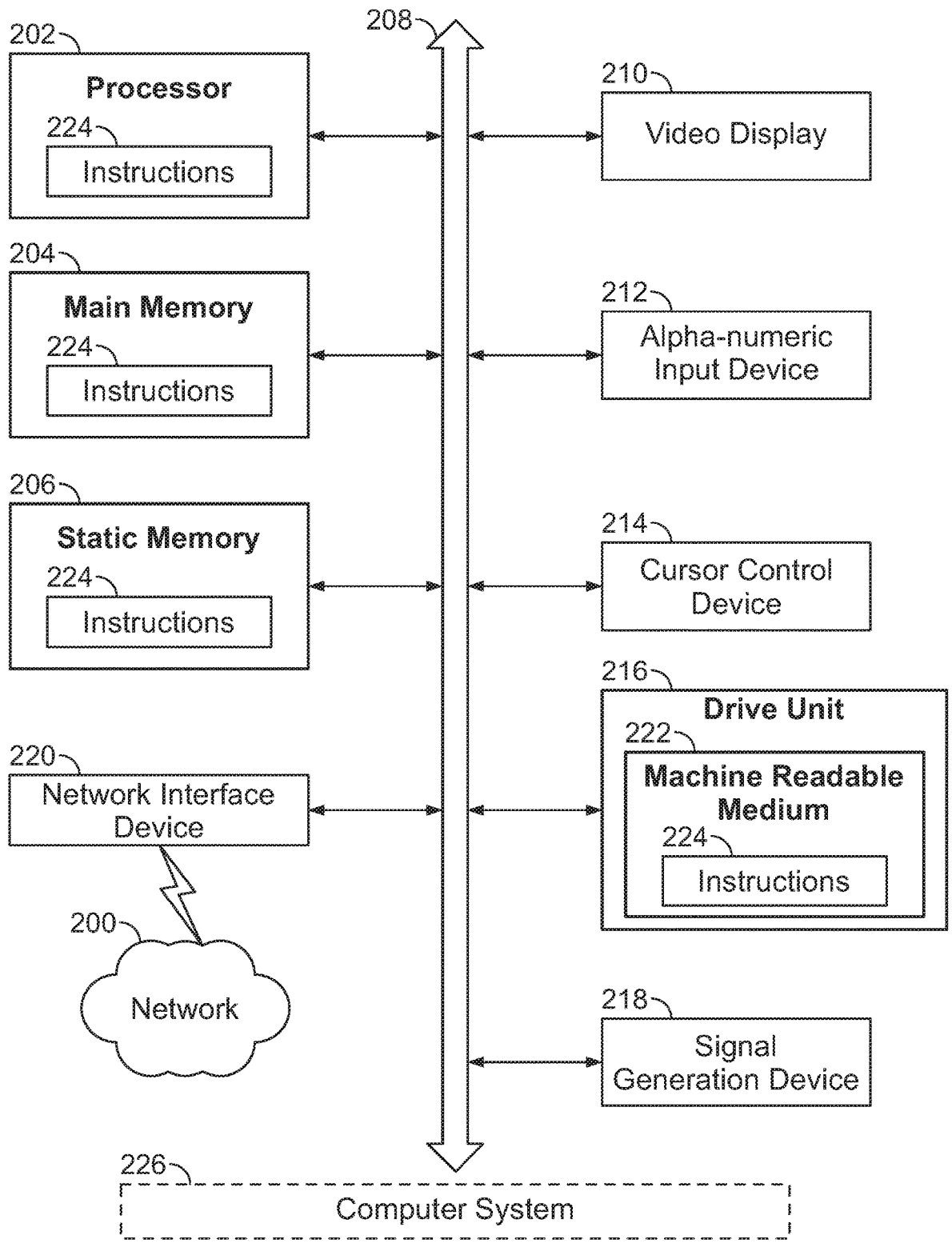
FIG. 2 is a diagrammatic representation of a data processing system capable of processing a set of instructions to perform any one or more of the methodologies herein, according to one embodiment.

FIG. 2 is a diagrammatic representation of a data processing system capable of processing a set of instructions to perform one or more of the methodologies herein, according to an example embodiment. FIG. 2 shows a diagrammatic representation of machine in an exemplary form of a computer system 226 within which a set of instructions for causing the machine to perform any one or more of the methodologies discussed herein may be executed. In various embodiments, the machine operates as a standalone device and/or may be connected (e.g. networked) to other machines.

In a networked deployment, the machine may operate in the capacity of a server and/or a client machine in server-client network environment and or as a peer machine in a peer-to-peer (or distributed) network environment. The machine may be a Personal Computer (PC), a tablet PC, a Set-Top Box (STB), a Personal Digital Assistant (PDA), a cellular telephone, a web appliance, a network router, a switch and/or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually or jointly execute a set (or multiple sets) of instructions to perform one and/or more of the methodologies discussed herein.

For example, computer system 226 includes a processor 202 (e.g. a central processing unit (CPU) or a graphics processing unit (GPU) or both), a main memory 204 and a static memory 206, which communicate with each other via a bus 208. The computer system 226 may further include a display unit 210 (e.g. a liquid crystal displays (LCD) and/or a cathode ray tube (CRT)). The computer system 226 also includes an alphanumeric input device 212 (e.g. a keyboard), a cursor control device 214 (e.g. a mouse), a disk drive unit 216, a signal generation device 218 (e.g. a speaker) and a network interface device 220.

The disk drive unit 216 includes a machine-readable medium 222 on which is stored one or more sets of instructions 224 (e.g. software) embodying any one or more of the methodologies and/or functions described herein. The instructions 224 constituting machine-readable media may also reside completely or at least partially within the main memory 204 and/or within the processor 202 during execution thereof by the computer system 226, the main memory 204 and the processor 202.

The instructions 224 may further be transmitted and/or received over a network 200 via the network interface device 220. While the machine-readable medium 222 is shown in an example embodiment to be a single medium, the term "machine-readable medium" should be taken to include a single medium and/or multiple media (e.g. a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to solid-state memories, optical and magnetic media, and carrier wave signals.

Figure 3:
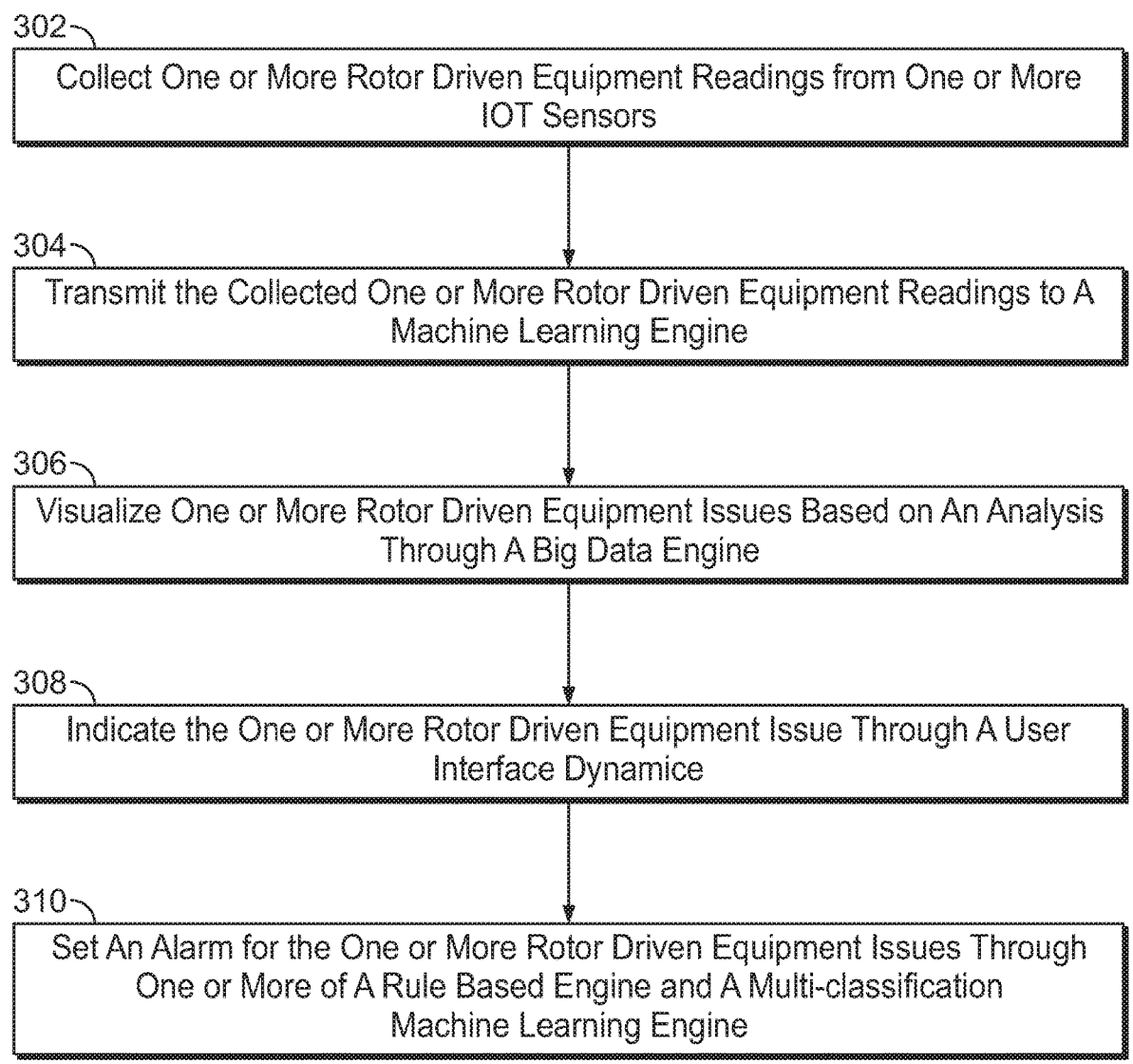
FIG. 3 is a process flow diagram detailing the operations of a method of predicting an electrical line issue, according to one or more embodiments.

FIG. 3 is a process flow diagram detailing the operations of a method of predicting an electrical line issue, according to one or more embodiments. A method of predicting an electrical line issue may comprise the steps of: (i) collecting one or more rotor driven equipment readings from one or more IoT sensors 302; (ii) transmitting the collected one or more rotor driven equipment readings to a machine learning engine 304; (iii) visualizing one or more rotor driven equipment issues based on an analysis through a big data engine 306; (iv) indicating the one or more rotor driven equipment issues through a user interface dynamic 308; and (v) setting an alarm for the one or more rotor driven equipment through one or more of a rule based engine and a multi-classification machine learning engine 310.

FIG. 4 is a diagrammatic representation of a circular gauge to depict a state of a rotor driven equipment, according to one example embodiment.

In an example embodiment, the rotor driven equipment system may be based on IoT (Internet of Things). The IoT based rotor driven equipment system may include sensors such as machine wearable sensors. Further, the system may be used for overseeing process control and predictive maintenance of one or more rotor driven equipment. The system may include a plurality of machine-wearable sensors, each of which may be associated with a rotor driven equipment. Each sensor is capable of transmitting captured rotor driven equipment data over a wireless communication network. The system may further include a sensor network for receiving and transmitting the captured data over a communication network and a machine learning algorithm engine capable of receiving data from the sensor network. The machine learning algorithm engine may process the received data to recognize one of a pattern and a deviation to issue control commands pertaining to the machine. Lastly, the system may include one or more control modules disposed in operative communication with a local firmware board associated with the rotor driven equipment where the local firmware board is capable of receiving and sending one or more control commands, executing the control commands and transmitting calculated/computed data over a communication network.

In one or more embodiments, a three stage computation may be necessary for rotor driven equipment diagnosis. First computation may be at the local firmware board, second computation at the data hub and last computation at the IoT server. A computation engine may be associated with one or more of the local firmware board, the data hub and IoT server over a communication network.

In one or more embodiments, a learning outcome as a result of analysis at IoT server may be dependent on recognition of one of a pattern and deviation recognized by the machine learning engine.

In an example embodiment, data may be collected from diverse locations such as 10,000 factory locations for 3P (prescriptive, preventative and predictive) maintenance by using a combination of Cassandra (distributed database), Storm and/or Spark real time to process the data in a real time Big Data architecture using a broker system such as Kafka for storing the alarms as buffer database and then using Storm and/or Cassandra like distributed database for an MRO (Maintenance, Repair and Operation) system. The real time Big Data architecture may be associated with the IoT server.

In one or more embodiments, 3P maintenance may be a possibility for a rotor driven equipment. Big data methodologies may be employed to analyze data obtained from various locations through an IoT sensor network. Big data may be used to describe a massive volume of both structured and unstructured data. Large volumes of data may be difficult to process using a traditional database and traditional software techniques. Therefore, a distributed real-time computation system such as Apache Storm may be used for distributed rotor driven equipment diagnosis.

In an example embodiment, a rotor driven equipment fault detection system may be associated with distributed databases. The rotor driven equipment fault detection system may be associated with a big data system.

In one or more embodiments, one or more rotor driven equipment issues may be determined based on one or more computations. Further, the determination may be based on an analysis associated with a machine learning engine.

In one or more embodiments, an alarm may be set through one of a rule based engine and a multi-classification machine learning engine.

In one or more embodiments, the communication network is one of Wi-Fi, 2G, 3G, 4G, GPRS, EDGE, Bluetooth, ZigBee, Piconet of BLE, Zwave or a combination thereof.

In one or more embodiments, an alarm may be raised over the communication network, through one of a notification on the mobile application, Short Message Service (SMS), email or a combination thereof.

In one or more embodiments, a system of detecting faults in rotor driven equipment may use an Internet of Things (IoT) based architecture for round the clock tracking of machines. The system may include sensor on chip technology, wireless network and a computation engine. The system may reduce operation costs of the machines by a large percentage. Reduction in costs may be achieved through a combination of single silicon chip, open source networking and cloud based software. Further, costs may be reduced by not using Fast Fourier Transforms and reducing sampling rates.

Figure 9:
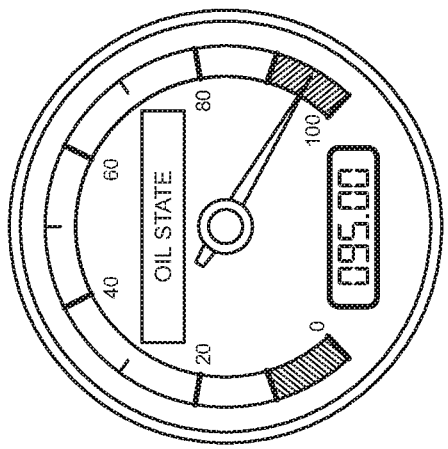
FIG. 9 is a diagrammatic representation of a predictive maintenance circular gauge associated with a rotor driven equipment, according to one embodiment.
Figure 9:
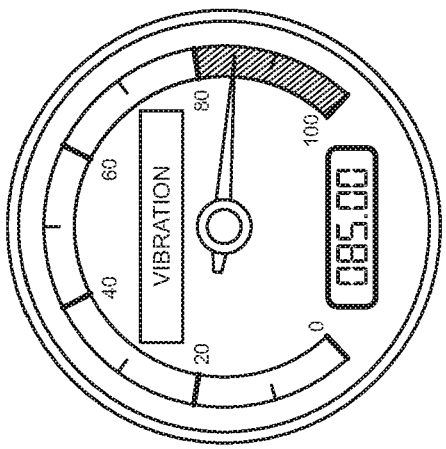
Figure 9:
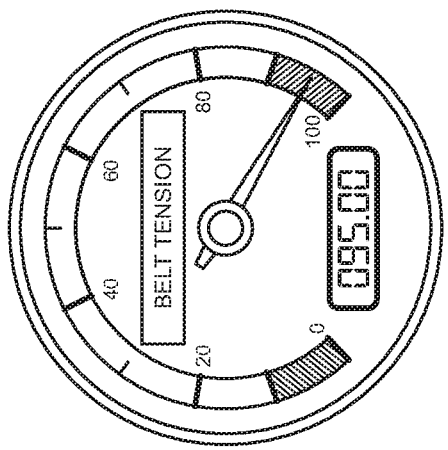
Figure 9:
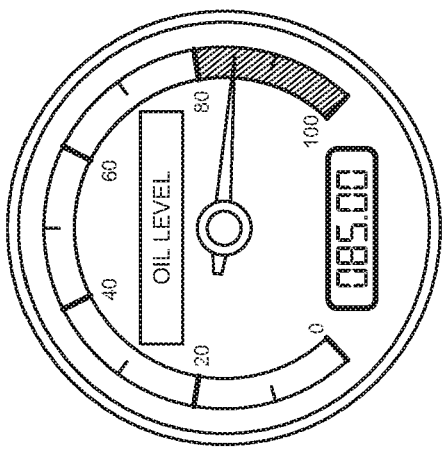
Figure 9:
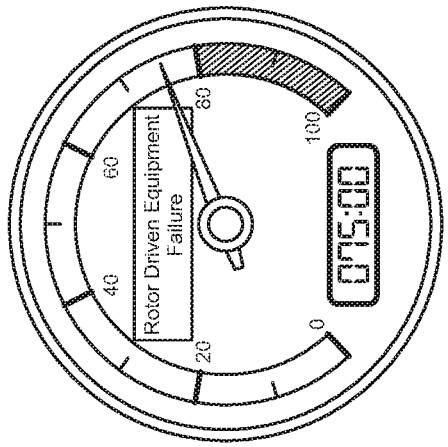
Figure 9:
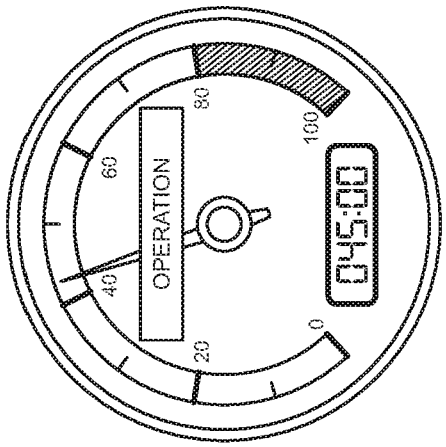

FIG. 9 is a diagrammatic representation of a predictive maintenance circular gauge associated with a rotor driven equipment, according to one embodiment. The predictive maintenance circular gauge may depict various electrical line issues such as rotor driven equipment failure, belt tension, oil state, operation condition, oil level, and vibration.

The predictive maintenance circular gauge may be associated with one or more color indications. The color indications may include red, yellow and green states. The red may indicate a danger mode of operation wherein the rotor driven equipment may comprise one of the failed rotor and/or the rotor driven equipment which is about to fail. The yellow may indicate an intermediate state of operation for the rotor driven equipment that the predictive maintenance gauge is associated with. The green state may indicate an ideal and/or smooth state of operation for the rotor driven equipment that the predictive maintenance circular gauge is associated with.

In one or more embodiments, an alarm may be raised when color scheme is one of a yellow and a red.

In one or more embodiments, IoT sensors may be enabled to compute through a computation engine. Computation engine may be associated with calculation of one or more of a kurtosis, crest factor, and percentile.

In one or more embodiments, a method of detecting faults in rotor driven equipment may include generating multiple axis vibration data from one or more vibration sensors communicatively coupled to the rotor driven equipment and collecting the data from the one or more machine wearable sensors onto a mobile data collector. Further, the method includes sampling the data at random to estimate a maximum value and controlling a sampling error under a predefined value. Still further, the method includes analyzing the data through a combination of Cartesian to Spherical transformation, statistics of extracted entity of one or more spherical variables, big data analytics engine and a machine learning engine. A fault associated with the rotor driven equipment may be displayed on a user interface.

Figure 10:
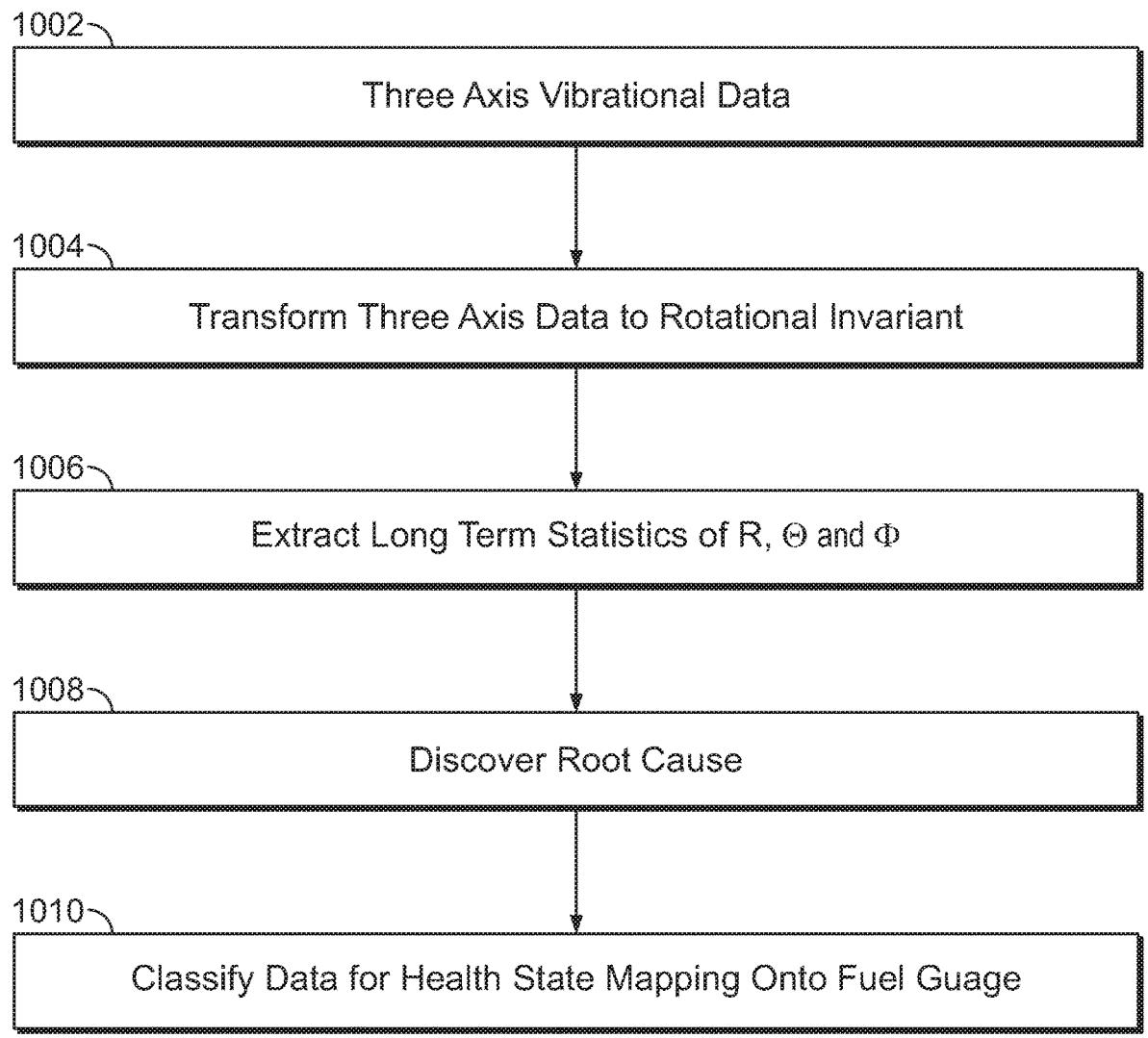
FIG. 10 is a flow diagram detailing data from a three axis vibrational data to a fuel gauge based predictive maintenance, according to one embodiment.

FIG. 10 is a flow diagram depicting a flow of data associated with a rotor driven equipment, according to one embodiment. FIG. 10 depicts flow of three axis vibration data onto a fuel gauge based predictive maintenance view. Three axis vibrational data 1002 may be received. The three axis vibration data may be transformed to a rotationally invariant form 1004. Long term statistics may be extracted for r, θ and φ 1006. A root cause may be discovered in association with a machine learning algorithm 1008. For example, bad oil, bearing failure etc. The data may be classified based on a health state 1010. The health state of rotor driven equipment may be classified into color schemes such as red, yellow and green. In an exemplary embodiment, the color scheme red may indicate an alarming rotor driven equipment condition, yellow may indicate an impending rotor driven equipment issue and green may indicate a healthy rotor driven equipment.

In one or more embodiments, an alarm may be raised when color scheme is one of a yellow and a red.

Although the present embodiments have been described with a reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a machine readable medium). For example, the various electrical structure and methods may be embodied using transistors, logic gates and electrical circuits (e.g. application specific integrated (ASIC) circuitry and/or in Digital Signal Processor (DSP) circuitry).

In addition, it will be appreciated that the various operations, processes and methods disclosed herein may be embodied in a machine-readable medium and/or a machine accessible medium compatible with a data processing system (e.g. a computer devices) and may be performed in any order (e.g. including using means for achieving the various operations). The medium may be, for example, a memory, a transportable medium such as a CD, a DVD, a Blu-Ray™ disc, a floppy disk, or a diskette. A computer program embodying the aspects of the exemplary embodiments may be loaded onto a retail portal. The computer program is not limited to specific embodiments discussed above and may, for example, be implemented in an operating system, an application program, a foreground or background process, a driver, a network stack or any combination thereof. The computer program may be executed on a single computer processor or multiple computer processors.

Although schematic implementations of present invention and at least some of its advantages are described in detail hereinabove, it should be understood that various changes, substitutions and alterations may be made to the apparatus and methods disclosed herein without departing from the spirit and scope of the invention as defined by the appended claims. The disclosed embodiments are therefore to be considered in all respects as being illustrative and not restrictive with the scope of the invention being indicated by the appended claims rather than by the foregoing description. All changes which come within the meaning and range of equivalency of the claims are therefore intended to be embraced therein. Moreover, the scope of this patent application is not intended to be limited to the particular implementations of apparatus and methods described in the specification, nor to any methods that may be described or inferentially understood by those skilled in the art to be present as described in this specification.

As disclosed above and from the foregoing description of exemplary embodiments of the invention, it will be readily apparent to those skilled in the art to which the invention pertains that the principles and particularly the compositions and methods disclosed herein can be used for applications other than those specifically mentioned. Further, as one of skill in the art will readily appreciate from the disclosure of the invention as set forth hereinabove, apparatus, methods, and steps presently existing or later developed, which perform substantially the same function or achieve substantially the same result as the corresponding embodiments described and disclosed hereinabove, may be utilized according to the description of the invention and the claims appended hereto. Accordingly, the appended claims are intended to include within their scope such apparatus, methods, and processes that provide the same result or which are, as a matter of law, embraced by the doctrine of the equivalents respecting the claims of this application.

As respecting the claims appended hereto, the term "comprising" means "including but not limited to", whereas the term "consisting of" means "having only and no more", and the term "consisting essentially of" means "having only and no more except for minor additions which would be known to one of skill in the art as possibly needed for operation of the invention." The scope of the invention is, therefore, indicated by the appended claims rather than by the foregoing description and all changes which come within the range of equivalency of the claims are to be considered to be embraced within the scope of the claims. Additional objects, other advantages, and further novel features of the invention will become apparent from study of the appended claims as well as from study of the foregoing detailed discussion and description of the preferred embodiments of the invention, as that study proceeds.

What is claimed is:

1. A method of detecting faults in a rotor driven equipment comprising:
    a. generating multiple axis vibration data from one or more vibration sensors communicatively coupled to the rotor driven equipment;
    b. collecting the data from the one or more machine wearable sensors onto a mobile data collector;
    c. sampling, through a processor, the data at random to estimate a maximum value;
    d. controlling a sampling error under a predefined value, wherein the sampling error is associated with the data;
    e. analyzing the data through a combination of cartesian to spherical transformation making vibrational vectors invariant, statistics of extracted entity of one or more spherical variables, big data analytics engine and a machine learning engine; and
    f. displaying on a user interface an alarm indicating a fault associated with the rotor driven equipment as determined by the data analysis performed in limitation "e", wherein the user interface is a predictive maintenance circular gauge.

2. The method of claim 1, further comprising detecting at least one rotor driven equipment fault based on one or more computations.

3. The method of claim 2, wherein a computation engine enables the one or more computations including at least one of a series of entity extraction of vibrational data, RMS, variance and kurtosis of azimuthal angle, peak to RMS ratio, percentiles ratio, and ratio of variance for each individual vibration axis.

4. The method of claim 1, wherein the alarm is set through at least one of a rule based engine and a multi-classification machine learning engine.

5. The method of claim 1, wherein
    a. the rotor driven equipment issues include at least one of a belt tension, filter condition, abusive operation, oil level, and viscosity of oil;
    b. the issues are discovered through a machine learning multi-classification; and
    c. the machine learning multi-classification includes at least one of a neural network, random forest, logistical regression, and support vector machine (SVM).

6. The method of claim 1 wherein the vibrational sensor data are collected onto the mobile data collector via a communication network comprising at least one of Wi-Fi, 2G, 3G, 4G, GPRS, EDGE, Bluetooth, ZigBee, Piconet of BLE, Zwave or a combination thereof.

7. The method of claim 1, wherein the alarm indicative of a detected fault is raised over a communication network through one of a notification on the mobile application, Short Message Service (SMS), email or a combination thereof.

* * * * *